(12) United States Patent
Manz et al.

(10) Patent No.: US 12,095,251 B2
(45) Date of Patent: Sep. 17, 2024

(54) LONG BUSBARS HAVING SEGMENTS FOR INCREASED ROBUSTNESS

(71) Applicant: SAINT-GOBAIN GLASS FRANCE, Courbevoie (FR)

(72) Inventors: Florian Manz, Aachen (DE); Michael Labrot, Aachen (DE); Jefferson Do Rosario, Aachen (DE); Andreas Sznerski, Alsdorf (DE); Sebastian Schurse, Übach-Palenberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 726 days.

(21) Appl. No.: 17/049,844

(22) PCT Filed: Mar. 29, 2019

(86) PCT No.: PCT/EP2019/058016
§ 371 (c)(1),
(2) Date: Oct. 22, 2020

(87) PCT Pub. No.: WO2019/206561
PCT Pub. Date: Oct. 31, 2019

(65) Prior Publication Data
US 2021/0242674 A1 Aug. 5, 2021

(30) Foreign Application Priority Data
Apr. 23, 2018 (EP) .................... 18168755

(51) Int. Cl.
*H01B 5/14* (2006.01)
*B32B 17/10* (2006.01)
(Continued)

(52) U.S. Cl.
CPC ......... *H02G 5/02* (2013.01); *B32B 17/10036* (2013.01); *B32B 17/10211* (2013.01);
(Continued)

(58) Field of Classification Search
CPC .. H01B 5/14; H01B 5/16; G02F 1/137; G02F 1/13306
See application file for complete search history.

(56) References Cited

U.S. PATENT DOCUMENTS 3,612,745 A 10/1971 Warren
4,109,044 A * 8/1978 Marriott ................... H05B 3/84
219/547
(Continued)

FOREIGN PATENT DOCUMENTS

CN 104246585 A 12/2014
CN 204887505 U 12/2015
(Continued)

OTHER PUBLICATIONS

International Search Report as issued in International Patent Application No. PCT/EP2019/058016, dated Jun. 3, 2019.
(Continued)

*Primary Examiner* — Chau N Nguyen
(74) *Attorney, Agent, or Firm* — Pillsbury Winthrop Shaw Pittman LLP

(57) ABSTRACT

A vehicle includes an outer glass pane, an outer laminated layer, an inner laminated layer, and one inner glass pane, wherein a PDLC layer stack is arranged between the outer and inner laminated layers, the PDLC layer stack formed by a) an outer polymeric carrier layer, b) an outer electrically conductive layer, c) a PDLC layer, d) an inner electrically conductive layer, and e) an inner polymeric carrier layer, wherein at a lateral section of the PDLC layer stack, the inner electrically conductive layer protrudes together with the inner polymeric carrier layer, and at another lateral section of the PDLC layer stack, the outer electrically conductive layer protrudes together with the outer polymeric carrier layer, and a busbar is arranged in each case on the
(Continued)

protruding inner electrically conductive layer and the protruding outer electrically conductive layer.

21 Claims, 5 Drawing Sheets

(51) Int. Cl.
    *B60R 16/02*      (2006.01)
    *H02G 5/02*      (2006.01)

(52) U.S. Cl.
    CPC .. *B32B 17/10376* (2013.01); *B32B 17/10504* (2013.01); *B32B 17/10761* (2013.01); *B60R 16/02* (2013.01); *H01B 5/14* (2013.01); *B32B 2307/102* (2013.01); *B32B 2605/00* (2013.01)

(56) References Cited

U.S. PATENT DOCUMENTS

| | | | |
|---|---|---|---|
| 4,283,593 A * | 8/1981 | Piasecki | H01B 7/36 |
| | | | 174/117 FF |
| 4,778,732 A | 10/1988 | Hasegawa et al. | |
| 5,861,606 A * | 1/1999 | Castle | B32B 17/10036 |
| | | | 52/171.2 |
| 6,185,812 B1 | 2/2001 | Castle et al. | |
| 6,927,343 B2 * | 8/2005 | Watanabe | H01R 12/714 |
| | | | 174/254 |
| 7,223,940 B2 | 5/2007 | Voeltzel et al. | |
| 9,400,411 B2 | 7/2016 | Poix et al. | |
| 9,891,454 B2 * | 2/2018 | Zhang | G02F 1/1339 |
| 10,593,502 B1 * | 3/2020 | Lanoe | H01H 85/0241 |
| 2005/0190332 A1 * | 9/2005 | Yano | B32B 17/10036 |
| | | | 349/149 |
| 2013/0141656 A1 | 6/2013 | Kujawa et al. | |
| 2013/0265511 A1 | 10/2013 | Poix et al. | |
| 2015/0001983 A1 * | 1/2015 | Hildinger | H01B 3/422 |
| | | | 427/104 |
| 2015/0114945 A1 * | 4/2015 | Miller | B64C 27/463 |
| | | | 219/202 |
| 2015/0244089 A1 | 8/2015 | Reul et al. | |
| 2019/0079365 A1 * | 3/2019 | Sarrach | G02F 1/1533 |

FOREIGN PATENT DOCUMENTS

| | | |
|---|---|---|
| CN | 106416425 A | 2/2017 |
| CN | 106457774 A | 2/2017 |
| CN | 107667080 A | 2/2018 |
| EP | 0 719 075 A2 | 6/1996 |
| EP | 2 982 507 A1 | 2/2016 |
| JP | 2013-531276 A | 8/2013 |
| JP | 2014-500972 A | 1/2014 |
| WO | WO 2016/193669 A1 | 12/2016 |
| WO | WO 2017/135182 A1 | 8/2017 |

OTHER PUBLICATIONS

Notice of Reasons for Rejection as issued in Japanese Patent Application No. 2020-558868, dated Jan. 11, 2022.
Notice of Reasons for Rejection as issued in Japanese Patent Application No. 2020-558868, dated Aug. 2, 2022.
Search Report as issued in Chinese Patent Application No. 201980000918.7.
Notice of Final Rejection as issued in Korean Patent Application No. 10-2020-7033399, dated Jun. 26, 2023.
Search Report as issued in Russian Patent Application No. 2020138034, dated Feb. 24, 2021.

* cited by examiner

LONG BUSBARS HAVING SEGMENTS FOR INCREASED ROBUSTNESS

CROSS-REFERENCE TO RELATED APPLICATIONS

This application is the U.S. National Stage of PCT/EP2019/058016, filed Mar. 29, 2019, which in turn claims priority to European patent application number 18 168 755.9 filed Apr. 23, 2018. The content of these applications are incorporated herein by reference in their entireties.

FIELD

The invention relates to a PDLC vehicle pane that has long busbars with increased robustness.

SUMMARY

PDLC layers (PDLC=polymer dispersed liquid crystal, liquid crystal dispersed in polymer) are mostly white films, whose light transmittance can be changed by applying an electrical voltage; in particular, they can be switched between a transparent mode and an opaque mode. PDLC panes, also referred to as PDLC glass (English: smart glazing) or intelligent glass, are panes that have such a PDLC layer and can, consequently, be switched between a transparent and an opaque mode.

The current market for PDLC panes is in particular for use as windows in the construction industry. Panes of PDLC glass are, however, also of interest for vehicles, in particular for automotive glazing. Here, they can, for example, make the installation of sun visors superfluous.

The incorporation of PDLC films also requires busbars, through which the contact to the electrical power supply and the distribution of the electrical current to the PDLC film is done. With switchable PDLC films, the busbars used today are either short or divided into multiple sections. In addition, PDLC glasses are primarily used in buildings, in which the glasses are flat, which reduces the load on the busbars.

However, when using PDLC glass for automotive glazing, special requirements must be taken into account. One of these requirements is homogeneous switching, which requires long busbars. Power failures have been observed in combination with the bending shape of the vehicle pane and thermal changes.

A prior art busbar connected to a PDLC film, as depicted in FIG. 1, with the conventional materials is realized in 4 steps.

1. Selective cutting of PET carrier layer 2 including ITO coating 3,
2. Removal of the PDLC switchable core layer 4 from the ITO coating 3,
3. Application of silver paste 19, e.g., by painting or printing and drying
4. Attachment of copper busbars 8 (e.g., either with adhesive busbars or with conductive double-sided adhesive strips)

On the opposite side of the PDLC film, the PET carrier layer 6 is cut instead of the PET carrier layer 2.

All of these materials have different thermal expansions. This results in high stresses particularly during the laminating process for producing the vehicle pane, but also during the service life of the vehicle, in which extreme weather conditions can occur. In addition, tensions occur when the films used in the pane are bent to the shape of the automotive glass.

Such tensions can locally peel the very thin electrically conductive layer of the PDLC film, e.g., an ITO coating, from the polymeric carrier layer of the PDLC film, e.g., a PET layer, possibly resulting in a lost connection.

The realization of long busbars on switchable PDLC glazings with complex shapes, such as, in automotive glazings is desirable for improved electrical properties. However, bending and temperature fluctuations during production and/or in use trigger tensions that can lead to the following problems:

- delamination
- local increase in electric current
- local temperature increase
- local reduction of opacity in the OFF mode
- loss of electrical contact.

These problems are due to a lack of mechanical robustness of the busbars and their connection to the PDLC system. These problems are more pronounced the longer busbar, which is why short busbars are used in the prior art.

US 2013/265511 A1 relates to a liquid crystal multiple glazing, in which a liquid crystal device formed from two glass panes coated with indium tin oxide and a liquid crystal layer positioned therebetween is arranged between a first pane and a second pane. The indium tin oxide layers serve as electrodes, which are, in each case, connected to a busbar made of flexible copper film.

EP 0719075 A2 describes an electrically heated window, comprising two panes that are laminated together by means of an intermediate layer, heating elements between the panes and elongated electrically conductive connecting devices, wherein the connecting device has at least one busbar with a corner that includes a separate corner part that is electrically connected to at least one adjacent part of busbar. The connection of the parts can be formed by an overlapping arrangement. A solder can be used for the connection.

SUMMARY

The object of the invention is, consequently, to provide a vehicle pane having a PDLC layer that, through incorporation of long busbars, enables improved electrical properties, in particular more homogeneous switching, while, at the same time, achieving increased mechanical robustness of the busbar in order to alleviate or to completely eliminate the problems described above with regard to bending and/or temperature fluctuations.

This object was accomplished in particular by the following measures. By cutting the busbar into multiple parts, the mechanical stress is reduced. Bridges or overlapping steps can be used for contacting the individual parts. These solutions act as expansion joints and ensure the robustness of the solution.

The object was therefore accomplished by a vehicle pane in accordance with claim 1 and a vehicle in accordance with claim 15. Preferred embodiments of the invention are set forth in the dependent claims.

Advantages of the invention are a significantly more robust design of the busbar, by means of which mechanical stresses can be better withstood, e.g., in the case of bending and/or temperature fluctuations. Thus, longer embodiments of the busbar, e.g., with lengths of more than 50 cm and even more than 100 cm, are possible, without causing problems such as delamination, local increase in electric current, local temperature increase, local reduction of opacity in the OFF mode, and loss of electrical contact. Through the use of long busbars, the electrical properties of the PDLC system are improved, in particular, there is more homogeneous switchability.

The invention thus relates to a vehicle pane 1, comprising, in this order, an outer glass pane, one or a plurality of outer laminated layers, one or a plurality of inner laminated layers, and an inner glass pane, wherein a PDLC layer stack is arranged between the outer laminated layer(s) and the inner laminated layer(s), which PDLC layer stack is formed from, in this order, a) an outer polymeric carrier layer 2,
b) an outer electrically conductive layer 3,
c) a PDLC layer 4,
d) an inner electrically conductive layer 5, and
e) an inner polymeric carrier layer 6,
wherein at a lateral section of the PDLC layer stack, the outer polymeric carrier layer 2, the outer electrically conductive layer 3, and the PDLC layer 4 are recessed such that the inner electrically conductive layer 5 protrudes there together with the inner polymeric carrier layer 6, and at another lateral section of the PDLC layer stack, the inner polymeric carrier layer 6, the inner electrically conductive layer 5, and the PDLC layer 4 are recessed such that the outer electrically conductive layer 3 protrudes there together with the outer polymeric carrier layer 2, and
a busbar 7, 8 is arranged in each case on the protruding inner electrically conductive layer 5 and the protruding outer electrically conductive layer 3, which busbar is connected to the electrically conductive layer 3, 5 of the PDLC layer stack via an electrically conductive intermediate layer 19, wherein
the busbars 7, 8 are in each case formed from at least two separate electrically conductive metal strips 9, 10, 11, 12, 13, 14, which are arranged one behind the other in the longitudinal direction, wherein the adjacent separate metal strips are electrically conductively connected via at least one bridge element 15 or an overlapping arrangement 16.

BRIEF DESCRIPTION OF THE DRAWINGS

The invention is explained in the following and in the accompanying figures. They depict.

DETAILED DESCRIPTION

Figure 1:
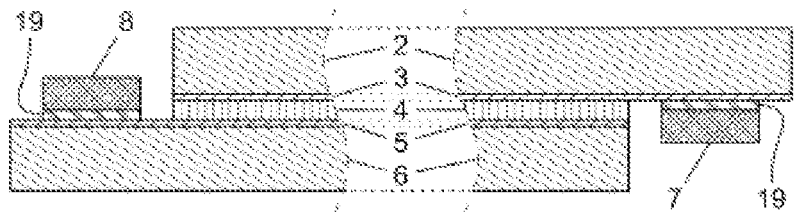
FIG. 1 a schematic cross-sectional view of the electrical connection of a busbar to the PDLC layer stack in a vehicle pane according to the prior art. Since in this cross-sectional view, the subdivision according to the invention of the busbar is not visible, it does not differ from a cross-sectional view of an embodiment according to the prior art.

The vehicle pane comprises, in this order, an outer glass pane, one or a plurality of outer laminated layers, one or a plurality of inner laminated layers, and an inner glass pane, wherein a PDLC layer stack is arranged between the outer laminated layer(s) and the inner laminated layer(s).

PDLC layer stacks are known and are commercially available in a large variety. The PDLC layer stack is often simply referred to as a PDLC film. Apart from the PDLC layer, corresponding films for the layers commonly contained in the vehicle pane that are commercially available are used for production.

The PDLC layer stack is arranged between the outer laminated layer(s) and the inner laminated layer(s). It is formed from the following layers, in this order:

a) an outer polymeric carrier layer,
b) an outer electrically conductive layer,
c) a PDLC layer,
d) an inner electrically conductive layer, and
e) an inner polymeric carrier layer.

The PDLC layer comprises a polymer matrix, in which liquid crystal droplets are embedded. In addition to the liquid crystal droplets, the polymer matrix can contain other components, e.g., spacers made of a nonconductive material of glass or plastic. The spacers are preferably transparent.

On both sides of the PDLC layer, an electrically conductive layer is also applied in each case on the polymer matrix; these are referred to here as the "inner electrically conductive layer" and the "outer electrically conductive layer". The inner electrically conductive layer and the outer electrically conductive layer can be the same or different, but are usually the same. The following information refers simply to an electrically conductive layer and applies equally to both the inner electrically conductive layer and the outer electrically conductive layer.

The electrically conductive layers are preferably transparent. The electrically conductive layer can, for example, contain transparent conductive oxides (TCOs). Examples include tin-doped indium oxide (ITO, also referred to as indium tin oxide), antimony-doped or fluorine-doped tin oxide ($SnO_2$:F), gallium-doped zinc oxide, or aluminum-doped zinc oxide (ZnO:Al), ITO being preferred. The thickness of the electrically conductive layers based on these transparent conductive oxides (TCOs) is preferably in the range from 10 nm to 2 μm, more preferably 30 nm to 500 nm, and in particular 50 to 100 nm.

The electrically conductive layer can also be a metal layer, preferably a thin layer or a stack of thin layers that include metal layers. Suitable metals are Ag, Al, Pd, Cu, Pd, Pt, In, Mo, Au, Ni, Cr, W. These metal coatings are referred to as TCC (transparent conductive coating). Typical thicknesses of the individual layers are in the range from 2 to 50 nm.

The thickness of the PDLC layer together with the outer and inner electrically conductive layer can, e.g., be in the range from 5 to 40 μm, preferably from 10 to 25 μm.

The (inner and outer) electrically conductive layers on the PDLC layer form electrodes that are in contact with the polymer matrix. In the pane according to the invention, the electrically conductive layers are implemented such that they can be connected via the busbars explained below to a voltage source that can be switched on and off. Without an electric field, the liquid crystal droplets of the polymer matrix are not aligned, resulting in the cloudy or opaque mode of the panes. This is the switched-off or opaque mode. Upon application of an electric field, the liquid crystal droplets are aligned in the same direction and the PDLC layer becomes transparent. This is the switched-on or transparent mode. The operation is reversible.

The PDLC layer stack further includes an outer polymeric carrier layer and an inner polymeric carrier layer, which are arranged on the outer sides of the PDLC layer stack and in which the PDLC layer and the inner and outer electrically conductive layers positioned thereon are embedded.

The outer polymeric carrier layer and the inner polymeric carrier layer can be the same or different, but are usually the same. The following information refers simply to a polymeric carrier layer and applies equally to both the outer polymeric carrier layer and the inner polymeric carrier layer.

The polymeric carrier layers preferably contain at least one thermoplastic polymer. The two polymeric carrier layers can be the same or different. The polymeric carrier layers can contain, e.g., polyethylene terephthalate (PET), ethylene vinyl acetate (EVA), polyvinyl butyral (PVB), polypropylene, polycarbonate, polymethyl methacrylate, polyacrylate, polyvinyl chloride, polyester resin, casting resins, acrylates, fluorinated ethylenepropylene, polyvinyl fluoride ethylene tetrafluoroethylene, or mixtures thereof. The polymeric carrier layers are particularly preferably PET layers. This is particularly advantageous in terms of the stabilization of the PDLC layer.

The thickness of each polymeric carrier layer, in particular of a PET carrier layer, can be, e.g., in the range from 0.1 mm to 1 mm, preferably from 0.1 mm to 0.2 mm.

The vehicle pane according to the invention is a composite glass pane which contains the PDLC layer stack as a functional layer. In addition, the vehicle pane includes an outer and an inner glass pane that are laminated by one or a plurality of laminating films on both sides of the functional layer to form a solid composite.

In the context of the invention, the term "inner glass pane", also called "inner pane", refers to the glass pane that, when installed in a vehicle, is intended as the pane of the vehicle pane facing the vehicle interior. "Outer glass pane", also called "outer pane", refers to the glass pane that, when installed the vehicle, is intended as the pane facing the external environment.

The vehicle pane can be a flat or curved vehicle pane. In the case of a flat vehicle pane, the inner and outer glass pane are flat. In the case of a curved vehicle pane, the inner and outer glass pane are curved.

The inner glass pane and the outer glass pane can be made of the same material or of a different material. The panes can be made of inorganic glass and/or organic glass (polymers). In a preferred embodiment, the inner glass pane and/or the outer glass pane contains glass and/or polymers, preferably flat glass, quartz glass, borosilicate glass, soda lime glass, alkali aluminosilicate glass, polycarbonate, and/or polymethacrylate. The inner glass pane and the outer glass pane are preferably made of soda lime glass.

The inner glass pane and the outer glass pane can have the same thickness or different thicknesses. Preferably, the inner glass pane and the outer glass pane have, independently of each other, a thickness in the range from 0.4 to 5.0 mm, e.g., 0.4 to 3.9 mm, more preferably 1.6 to 2.5 mm. For mechanical reasons, the outer pane is preferably thicker or the same thickness as the inner pane.

The inner glass pane and/or the outer glass pane can be clear or tinted. Tinted glass panes are preferably gray or dark gray.

The inner glass pane and/or the outer glass pane can have additional suitable coatings known per se, e.g., non-stick coatings, tinted coatings, anti-scratch coatings, or low-E-coatings. One example of coated glass is low-E glass (low-emissivity glass). Low-E glasses are commercially available and are coated with one or a plurality of metal layers. The metal coating is very thin, e.g., it has a thickness of approx. 10 to 200 nm, e.g., approx. 100 nm. When a coated glass is used as an inner and/or outer glass pane, the coating is preferably situated on the interior side of the glass pane relative to the vehicle pane.

The vehicle pane further includes one or a plurality of outer laminated layers between the outer glass pane and the PDLC layer stack and one or a plurality of inner laminated layers between the inner glass pane and the PDLC layer stack.

The outer laminated layer and the inner laminated layer can be the same or different, but are usually the same. The following information refers simply to a laminated layer and applies equally to both the outer laminated layer and the inner laminated layer.

The laminated layer is in particular a polymeric laminated layer. Preferably, the laminated layers contain a thermoplastic polymer. The following information applies, independently, to all of these one or a plurality of laminated layers, unless otherwise indicated. The laminated layers can be the same or different.

Usually, such commercially available laminating films are used as the starting material for forming the laminated layers. They are used to bond or laminate the components of the vehicle pane to obtain the adherent glass composite.

The laminated layer can, for example, contain polyvinyl butyral (PVB), ethylene vinyl acetate, polyurethane, polypropylene, polyacrylate, polyethylene, polycarbonate, polymethyl methacrylate, polyvinyl chloride, polyacetate resin, casting resin, acrylate, fluorinated ethylene propylene, polyvinyl fluoride, and/or ethylene tetrafluoroethylene and/or a mixture and/or a copolymer thereof. Preferably, the laminated layer contains polyvinyl butyral (PVB), ethylene vinyl acetate, polyurethane, and/or mixtures thereof and/or copolymers thereof, with PVB laminated layers preferred.

The laminated layers, preferably PVB laminated layers, preferably have a thickness from 0.1 to 1.5 mm, more preferably from 0.3 to 0.9 mm.

In addition to the above-mentioned polymeric laminated layers, the vehicle pane can optionally have one or a plurality of additional functional layers, in particular polymeric functional layers between the inner and outer glass pane. Examples include acoustic films, absorption films, and IR-reflective films or the acoustic layers or IR-reflective layers formed therefrom. IR is, as usual, an abbreviation for infrared. Absorption films can serve for absorbing UV light, IR light, or visible light. If other functional layers are contained in addition to the laminated layers, the functional layers are preferably arranged between two laminated layers. The layers arranged closest to the inner and outer glass pane are generally laminated layers.

Acoustic layers are, for example, constructed from multiple, e.g., three, PVB layers, with a softer PVB layer in the middle. Since the acoustic layers are also suitable as laminated layers, they can serve a dual function.

IR-reflective layers are, for example, formed by a polymeric carrier layer and an IR-reflective coating situated thereon. The polymeric carrier layer can, for example, be formed from form polyester, polycarbonate, cellulose acetate, acrylate, or polyvinyl chloride, with a PET carrier layer preferred. The IR-reflective coating can, in principle, be formed in different ways and preferably includes at least one silver layer. Generally common are multilayers with one or a plurality of silver layers as the actual functional layer, which are embedded between metallic and/or dielectric layers.

A specific configuration, which is usually obtained by appropriate processing of the PDLC layer stack, is required for connecting the busbar to the PDLC layer stack. In particular, at a lateral section of the PDLC layer stack, the outer polymeric carrier layer, the outer electrically conductive layer, and the PDLC layer are recessed such that the inner electrically conductive layer together with the inner polymeric carrier layer protrudes there. Also, at another lateral section of the PDLC layer stack, the inner polymeric carrier layer, the inner electrically conductive layer, and the PDLC layer are recessed such that the outer electrically conductive layer together with the outer polymeric carrier layer protrudes there.

The corresponding recesses at the lateral sections of the PDLC layer stack can be obtained in the usual manner. Typically, for example, at the corresponding sections, the polymeric carrier layer to be recessed including the associated electrically conductive layer is selectively removed by cutting. The exposed PDLC layer is then removed from the remaining electrically conductive layer, e.g., by simple rinsing. In this manner, at a lateral section, a protruding inner electrically conductive layer is obtained at one lateral section, and a protruding outer electrically conductive layer is obtained at another lateral section.

Arranged in each case on the protruding inner electrically conductive layer and the protruding outer electrically conductive layer is a busbar, which is connected to the electrically conductive layer of the PDLC layer stack via an electrically conductive intermediate layer.

In this manner, the busbars are electrically conductively connected to the electrically conductive layers of the PDLC layer stack. The busbars can be connected via contacts of supply lines to a voltage source for the power supply that can be switched on and off.

It is essential to the invention that the busbars are in each case formed from at least two separate electrically conductive metal strips, which are arranged one behind the other in the longitudinal direction, wherein the adjacent separate metal strips are electrically conductively connected via at least one bridge element or an overlapping arrangement.

The mechanical stress is reduced as a result of the subdivision of the busbar into multiple subsections that are electrically conductively connected via expansion joints. The expansion joints are necessary to reduce the load. This can be done either by bridge elements or by overlapping steps or an overlapping arrangement. The overlapping arrangement is advantageous, since the metal strips commonly used already have a conductive adhesive layer on one side, which can be used in the overlapping arrangement directly for connecting to the adjacent metal strip of the busbar. Thus, no additional work steps are necessary.

The electrically conductive intermediate layer is preferably a silver layer. Alternatively, for example, layers selected from copper layers, carbon layers, or tin antimony layers can also be used as an electrically conductive intermediate layer.

The electrically conductive intermediate layer, in particular the silver layer, can be applied in the usual manner on the protruding inner electrically conductive layer and the protruding outer electrically conductive layer. The coating can be done, e.g., by painting with a brush or roller, or by printing, e.g., by screenprinting, and, optionally, subsequent drying.

Optionally, it can be expedient to apply an adhesive strip between the location where the electrically conductive intermediate layer is to be applied and the complete PDLC layer stack before applying the electrically conductive intermediate layer. After applying the electrically conductive intermediate layer, the adhesive strip can be removed again. The advantage of this procedure consists in that, through alignment with the adhesive strip, the electrically conductive intermediate layer can be applied in a uniform thickness on the protruding electrically conductive layer, and the adhesive strip protects against unwanted contact of the intermediate layer to be applied with the other non-protruding electrically conductive layer in the complete PDLC layer stack.

For a silver layer, a common silver paste or conductive silver can be used, for example, as a coating composition. Silver pastes or conductive silver pastes usually contain high amounts of silver or silver alloy, e.g., at least 30 wt.-%, e.g., 30 to 88 wt.-%, as powder or flakes, organic binders, organic solvents, and, optionally, other additives. For the copper layers, carbon layers, or tin-antimony layers, copper contact paste, carbon conductive paste, or tin-antimony conductive paste can be used as a coating composition.

The electrically conductive intermediate layer, in particular the silver layer, can have a thickness of up to a few microns, e.g., a thickness in the range from 0.8 to 100 µm, preferably 1.5 to 75 µm.

The electrically conductive intermediate layer, in particular the silver layer, is preferably applied in a pattern, in particular, in strip form. Usually, the patterned shape of the electrically conductive intermediate layer corresponds to the shape of busbar to be applied thereon, wherein, optionally, smaller and/or larger dimensions are also possible. The busbar can, for example, be somewhat wider than the electrically conductive intermediate layer positioned below it.

The electrically conductive metal strip can be any suitable metal strip. Here, metal includes metal alloys. The electrically conductive metal strip is preferably a copper strip. The copper strip can be a strip of pure copper or of a copper alloy, e.g., a copper-tin alloy. Also suitable as a metal strip is a tin-coated copper strip, also regarded here as a copper strip.

The electrically conductive metal strip, in particular the copper strip, is applied on the electrically conductive intermediate layer, in particular the silver layer, and connected thereto, e.g., by gluing or soldering. A common conductive adhesive is usually used for gluing. A conductive adhesive is an electrically conductive adhesive: The conductivity can be achieved, for example, in that electrically conductive particles, such as silver particles, are contained in the adhesive.

The electrically conductive metal strip, in particular the copper strip, is preferably a self-adhesive metal strip. The self-adhesive metal strip, in particular self-adhesive copper strip, can be coated on one side or on both sides with a conductive adhesive. Such self-adhesive metal strips or copper strips are commercially available and are usually provided with a peel-off film for protection of the adhesive layer.

The self-adhesive metal strip, in particular self-adhesive copper strip, is advantageous, since it can simply be adhered directly to the conductive adhesive layer on the electrically conductive intermediate layer, in particular the silver layer, such that no additional work steps are required.

The thickness of the electrically conductive metal strip, in particular of the copper strip, can, for example, be in the range from 15 to 140 µm, preferably 15 to 110 µm, more preferably 30 to 100 µm. The width of the electrically conductive metal strip, in particular of the copper strip, can, for example, be in the range from 1 to 15 mm, preferably 3 to 9 mm.

The electrically conductive layers of the PDLC layer stack are preferably formed from transparent, conductive oxides, preferably indium tin oxide. Suitable and preferred thicknesses for these layers were mentioned above.

In one embodiment, a bridge element electrically conductively connects two adjacent electrically conductive metal strips to one another. The bridge element is made of an electrically conductive material, e.g., a metal, Including a metal alloy, preferably copper, including a copper alloy, such as a copper-tin alloy, and tin-coated copper. The bridge element can be made from the same material as the electrically conductive metal strip. Preferably, the bridge element is formed from copper strip. The bridge element can be a self-adhesive electrically conductive metal strip, in particular a self-adhesive copper strip.

The bridge element can have any suitable shape. It can be, e.g., U-shaped, V-shaped, or sawtooth-shaped or zigzag-shaped, with U-shaped preferred.

In a preferred embodiment, the bridge element is U-shaped, with one leg of the bridge element mounted on an electrically conductive metal strip, preferably copper strip and the other leg of the bridge element mounted on the adjacent, electrically conductive metal strip, preferably copper strip. The legs can be attached to the respective electrically conductive metal strip by bonding with conductive adhesive or by soldering, with soldering preferred, since a firmer connection can thus be achieved.

Suitable in particular as a U-shaped bridge element is an appropriately folded metal strip or copper strip. This is obtained in a simple manner with a piece of a metal strip, in particular a copper strip of suitable length, by diagonally folding the two end sections flat (cf. FIGS. 3A and 3B).

In one embodiment, two adjacent electrically conductive metal strips, in particular copper strips, are electrically conductively connected to one another by means of an overlapping arrangement. In the overlapping arrangement, an electrically conductive metal strip is not applied in its entire length on the electrically conductive intermediate layer applied and the (protruding) partial length not applied on the electrically conductive intermediate layer is overlappingly mounted on the adjacent metal strip. In other words, a metal strip is used that is longer than the length with which it is applied to the intermediate layer. The partial length of the metal strip not applied is attached overlappingly on the end of the adjacent metal strip. In this manner, there are two superimposed and joined metal strips in the overlapping region.

As explained above, the overlapping connection is preferably done using an adhesive bond, in particular with the use of a self-adhesive metal strip, in particular a copper strip.

In the case of the overlapping arrangement, the length of the region in which the two metal strips overlap can be selected depending on the specific requirements. It can be, for example, from 5 to 100 mm, preferably from 10 to 30 mm.

The at least one bridge element is mounted or attached preferably by gluing or soldering to the adjacent electrically conductive metal strips. With the overlapping arrangement, the part of the metal strip not applied on the intermediate layer is mounted or attached preferably by gluing or soldering to the adjacent electrically conductive metal strip. For gluing, a conductive adhesive is used in particular. With a bridge element, soldering is preferred since a stronger connection is thus obtained; however, gluing is also possible. With the overlapping arrangement, gluing using self-adhesive metal strips or copper strips is preferred since this is very easily done.

The invention makes it possible to provide long busbars that are mechanically robust despite their length. The busbars can have, for example, in each case a length of at least 50 cm. The busbars (7, 8) preferably have a length of at least 60 cm, more preferably at least 80 cm, and particularly preferably at least 100 cm. In principle, there is no upper limit for the length of the busbar; however, for practical reasons, it can be, for example, not more than half the circumference of the PDLC layer stack–100 mm (=(sum of the 4 side lengths of the PDLC layer stack)–100 mm). In some cases, the busbars can even be routed up to 50 mm around the corners of one side to the axis of symmetry of the film.

The length of the separate electrically conductive metal strips, in particular copper strips, from which the busbar is formed can, for example, be in range from 25 to 80 cm, preferably 30 to 60 cm. Only the length of the metal strip that is applied directly on the electrically conductive intermediate layer is considered as length. In the overlapping arrangement, the actual length of the metal strip can be greater if part of the metal strip is overlappingly mounted on the adjacent metal strip.

The distance between two adjacent, electrically conductive metal strips that are arranged on the electrically conductive intermediate layer can vary as necessary taking practical considerations into account. It can, for example, be expedient to arrange the separate metal strips immediately adjacent one another, i.e., with virtually no space between them, in particular in the overlapping arrangement. On the other hand, a certain distance can be expedient to simplify production and/or to avoid interactions between the separate metal strips. The distance between two adjacent, electrically conductive metal strips, in particular copper strips, can, for example, be in the range from 0 to 50 mm, preferably from 3 to 10 mm, in particular with the use of bridge elements.

The busbar can be formed from two or more separate electrically conductive metal strips. The suitable number can be varied as necessary and depends in particular on the desired overall length of the busbar. The busbar can, for example, be formed from two, three, four, or more separate electrically conductive metal strips, in particular copper strips, arranged one behind the other in the longitudinal direction, with the use of two, three, or four, in particular three, separate electrically conductive metal strips preferred.

It goes without saying that with the use of more than two separate electrically conductive metal strips for the busbar, there is more than one location with adjacent metal strips, all of which must be electrically conductively connected to one another via at least one bridge element or one overlapping arrangement.

In a preferred embodiment, one busbar is arranged in a side region of one side of the vehicle pane, and the other busbar is arranged in the side region of the opposite side of the vehicle pane. Here, it is preferable for the two sides in whose side regions the busbars are arranged to be longer than the other two sides of the vehicle pane. The longer opposite sides of the vehicle pane are usually the sides that constitute the upper side and the lower side of the vehicle pane in the installed state.

The electrically conductive intermediate layer, in particular silver layer, under the busbar is in particular a continuous electrically conductive intermediate layer. This means that the intermediate layer is present continuously under the entire busbar, even at the locations where two metal strips of the busbar are adjacent one another.

In one embodiment, the PDLC layer stack can additionally be sealed laterally with an adhesive sealant and/or a thermoplastic strip to protect against corrosion. The sealing can, optionally, also include the busbars. "Laterally" refers, here, to the side surfaces of the PDLC layer stack as opposed to the upper and lower side of the PDLC layer stack.

The adhesive sealant can, for example, be a polyvinyl butyral (PVB) adhesive sealant and/or be implemented in the form of a frame. The remaining free edge is sealed all around by the adhesive sealant, which has the same thickness as the PDLC layer stack and thus also functions as a spacer. In this manner, the PDLC layer stack is laterally framed by the adhesive sealant.

Typically, the inner and/or the outer glass pane can have a coating in one or a plurality of edge regions, preferably all edge regions, preferably a coating with a ceramic paint, such as a black ceramic paint. Coating the side edges with ceramic paint serves, for example, to visually conceal the busbars or adhesives that are used in the installation of a glass pane on a vehicle. Therefore, the busbars are preferably arranged inside regions of the vehicle pane where the inner and/or the outer glass pane is/are provided with an opaque coating, in particular a ceramic paint coating.

The vehicle pane according to the invention is suitable for all vehicles, e.g., motor vehicles, trains, watercraft, or aircraft, with motor vehicles particularly preferred. Examples of suitable motor vehicles are buses, tractors, trucks, and passenger cars, with passenger cars particularly preferred.

In a preferred embodiment, the vehicle pane is a sliding roof panel, a glass roof, a rear window, a rear side window, or a front side window, preferably in a motor vehicle, in particular a passenger car.

The invention also relates to a vehicle including at least one vehicle pane according to the invention, the vehicle preferably being a motor vehicle. Suitable and preferred vehicles are mentioned above.

The invention is further explained in the following using non-restrictive exemplary embodiments with reference to the attached drawings.

A cross-sectional view of the electrical connection of a busbar to the PDLC layer stack in a vehicle pane according to the invention (not shown) is similar to that of FIG. 1. Specifically, since, in this cross-sectional view, the subdivision of the busbar is not visible, it does not differ from a cross-sectional view of an embodiment according to the prior art. That is, the PDLC layer stack is formed from a polyethylene terephthalate (PET) layer as an outer polymeric carrier layer 2, an indium tin oxide (ITO) layer as an outer electrically conductive layer 3, a PDLC layer 4, an ITO layer as an inner electrically conductive layer 5, and a PET layer as an inner polymeric carrier layer 6. The ITO layers have a thickness of approx. 50 to 300 nm. On one side section of the PDLC layer stack, the outer polymeric carrier layer 2, the outer electrically conductive layer 3, and the PDLC layer 4 are recessed such that, there, the inner ITO layer 5 together with the inner PET layer 6 protrude from the PDLC layer stack. A silver layer is arranged on the inner ITO layer 5 as an intermediate layer 19 that has a thickness of approx. 25 μm and a width of approx. 5 mm. Above the silver layer, there is a busbar 8 formed from a copper strip, which busbar has a thickness of approx. 30 to 100 μm and a width of approx. 6 mm. The copper strip used for the busbar is a self-adhesive strip that has an adhesive layer of conductive adhesive on one side and is bonded therewith to the silver layer. Alternatively, a tinned copper strip and, for fixation, a double-sided conductive adhesive tape can be used.

Analogously, with the same geometry and the same materials, there is, on the other side of the PDLC layer stack, a busbar 7 that is arranged on the protruding outer ITO layer 3 via the intermediate layer 19.

The busbars 7, 8 are contacted with supply lines that implement the connection to an ON-and-OFF switchable electrical voltage source (not shown). The other components of the vehicle pane are also not shown for reasons of clarity. For example, the intermediate spaces in the vehicle pane present in FIG. 1 are usually filled by the material of the laminated layers and/or adhesive sealant.

Figure 2A:
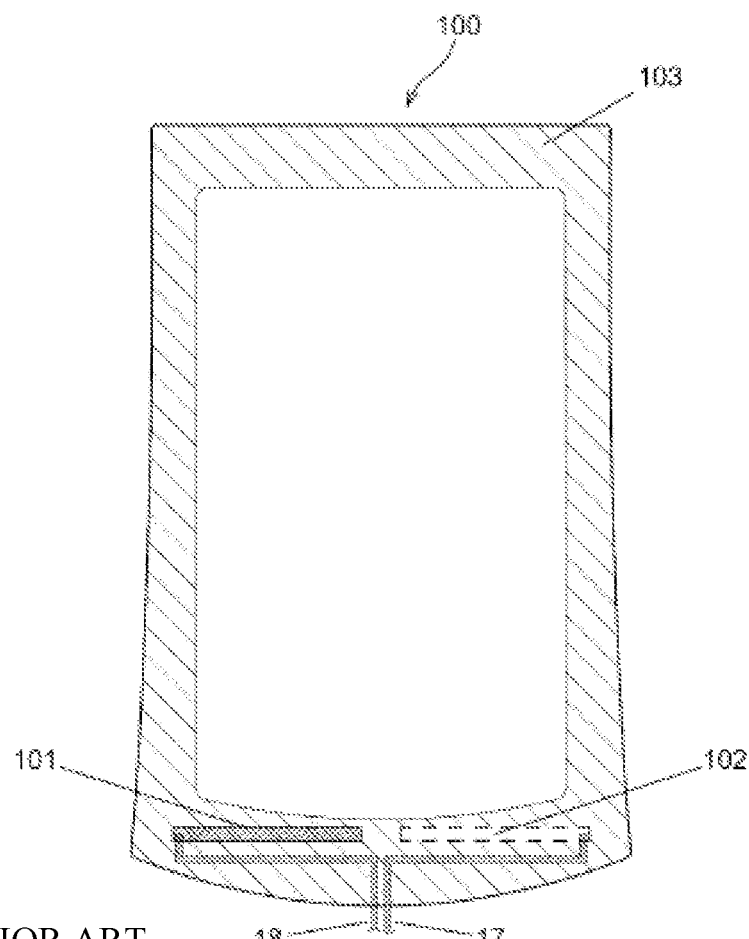
FIG. 2 schematic plan views of a prior art PDLC vehicle pane (FIG. 2A), a PDLC vehicle pane according to the invention with bridge elements (FIG. 2B), and a PDLC vehicle pane according to the invention with an overlapping arrangement (FIG. 2C)
Figure 2B:
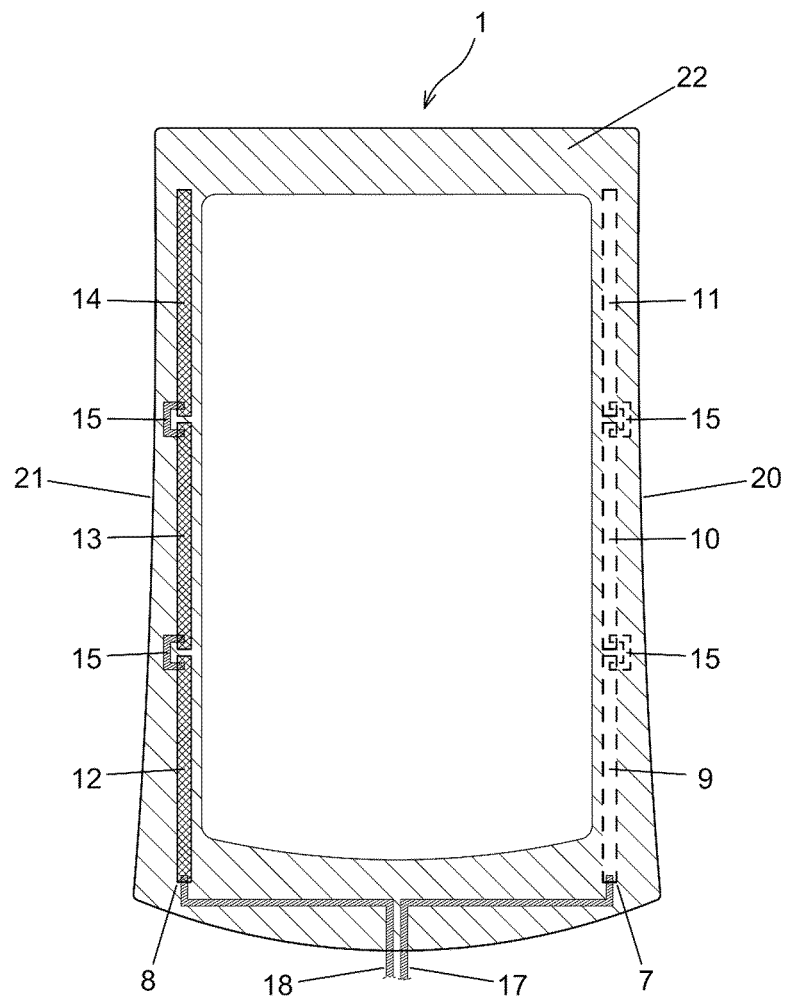
Figure 2C:
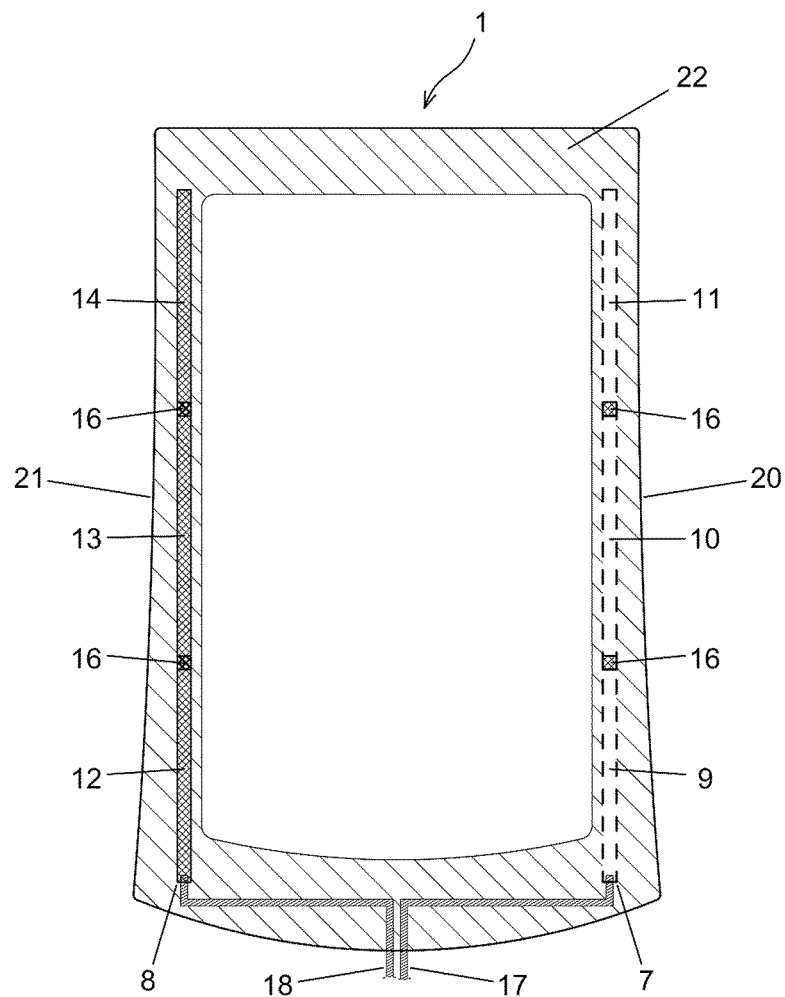

FIG. 2 depicts schematic plan views of a prior art PDLC vehicle pane 100 (FIG. 2A), a PDLC vehicle pane 1 according to the invention with bridge elements (FIG. 2B), and a PDLC vehicle pane 1 according to the invention with an overlapping arrangement (FIG. 2C), all based on the fundamental connection of the busbar to the PDLC layer stack depicted in FIG. 1. In all of the vehicle panes depicted, the outer edge regions of a glass pane are provided with a black ceramic paint (103, 22) as optical protection. In all of the vehicle panes depicted, the upper glass pane and the upper laminated layers are omitted for reasons of clarity. Furthermore, in all of the vehicle panes depicted, in the lower region of the drawing, supply lines (17, 18) connected to the busbars and leading to a contact strip and serving for connection to a voltage element are shown.

FIG. 2A depicts a prior art PDLC vehicle pane 100, in which the busbars 101, 102 are in each case formed from a continuous copper strip. The length of the busbars is relatively short (approx. 40 cm). Both busbars are arranged in the side region of the short side of the vehicle pane. The length of the prior art busbars is generally less than half the side width of the PDLC film and usually not more than 50 cm.

FIG. 2B depicts a PDLC vehicle pane 1 according to the invention. Both busbars are arranged on side edge regions of opposite sides 20, 21 of the vehicle pane that are longer than the other two sides of the vehicle pane. Each busbar is formed from three separate copper strips 12, 13, 14 or 9, 10, 11 arranged one behind the other in the longitudinal direction. The separate copper strips have in each case a length of approx. 40 cm. The adjacent copper strips are in each case electrically conductively connected to one another via a bridge element 15. The bridge element is a U-shaped copper strip and is described in greater detail in FIGS. 3A and 3B. The total length of the busbars 7, 8 is in each case approx. 120 cm. The great length results in very homogeneous switching capability of the PDLC system. Despite the great length, the busbars exhibit excellent robustness against mechanical loads.

With an arrangement according to FIG. 2B, connection of a 20-V voltage source at 40° ° C. in the transparent mode yields a quite homogeneous value for the cloudiness (haze) over the entire area of the vehicle pane of approx. 40-45%. An arrangement according to FIG. 2C yields a similar result. In contrast, with an arrangement according to the prior art, as in FIG. 2A, the values for cloudiness (haze) are significantly more inhomogeneous. For example, the vehicle pane according to FIG. 2A has, in the vicinity of where the busbars are arranged, cloudiness (haze) of approx. 40-45%, but this value worsens the farther in the direction of the opposite side of the pane the measurement is made. For example, the cloudiness (haze) with the pane of FIG. 2A in the vicinity of the side opposite the busbars is approx. 90 to 95%.

FIG. 2C depicts another PDLC vehicle pane 1 according to the invention. Both busbars are arranged on side edge regions of opposite sides 20, 21 of the vehicle pane that are longer than the other two sides of the vehicle pane. Each busbar is formed from three separate copper strips 12, 13, 14 or 9, 10, 11 arranged one behind the other in the longitudinal direction. The separate copper strips have in each case, if they are mounted directly on the silver layer (not shown), a length of approx. 40 cm. The copper strips used for the overlapping are somewhat longer, with the part not applied on the silver layer serving for the overlapping. The adjacent copper strips are in each case electrically conductively connected to one another via an overlapping arrangement 16. The overlapping arrangement is described in greater detail in FIGS. 4 and 5. The total length of the busbar 7, 8 is in each case approx. 120 cm. The great length yields very homogeneous switchability of the PDLC system. Despite the great length, the busbars exhibit excellent robustness against mechanical loads.

Figure 3A:
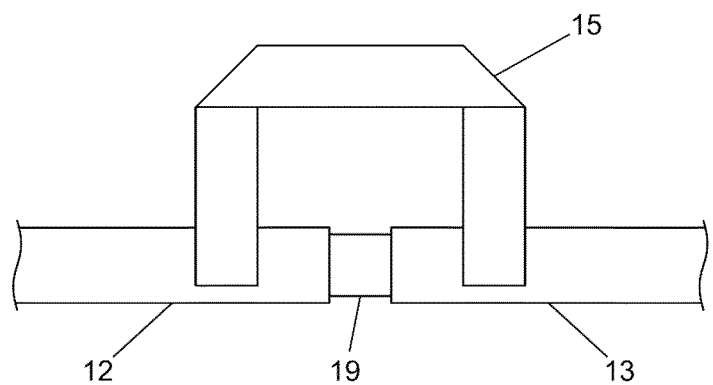
FIG. 3 schematically, a bridge element that connects two separate metal strips of the busbar, in front elevation (FIG. 3A) and back elevation (FIG. 3B)
Figure 3B:
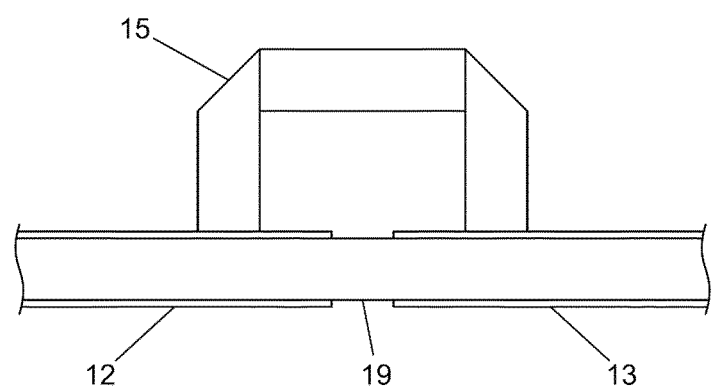

FIGS. 3A and 3B schematically depict a bridge element 15 that connects two separate copper strips 12, 13 of the busbar. FIGS. 3A and 3B are a detailed view of FIG. 2B, wherein FIG. 3A depicts the front elevation and FIG. 3B depicts the back elevation. The separate copper strips 12, 13 are, as components of the busbar, applied on the silver layer 19. The distance between the two separate copper strips 12, 13 is approx. 5 mm. The bridge element is likewise formed from a copper strip. The copper strip for the bridge element 15 is folded flat on a diagonal at both end regions, yielding a U-shaped bridge element 15. One leg of the bridge element is soldered onto the separate copper strip 12; the other leg, onto the separate copper strip 13.

Figure 4:
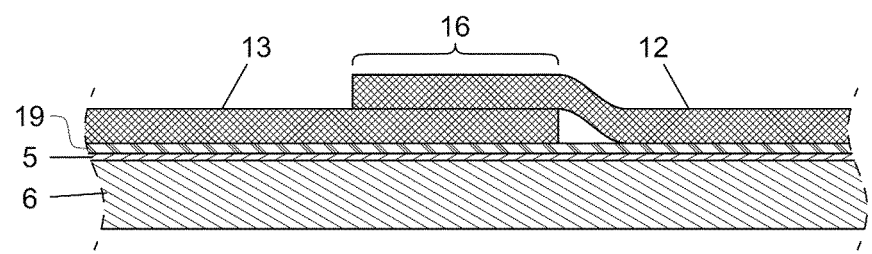
FIG. 4 schematically, an overlapping arrangement of two separate metal strips of the busbar in cross-section.

FIG. 4 schematically depicts an overlapping arrangement of two separate copper strips 12, 13 of the busbar in cross-section. FIG. 4 is a detailed view of FIG. 2C. The cross-section runs in the longitudinal direction of the busbar on the protruding inner electrically conductive layer of the PDLC layer stack. On the inner PET carrier layer 6, there is the ITO layer as the inner electrically conductive layer 5, and above the ITO layer, there is the silver layer as the intermediate layer 19. Above the silver layer, the copper strips 12, 13 are depicted in the overlapping arrangement 16. The copper strips 12, 13 are self-adhesive copper strips and are glued onto the silver layer. The copper strip 12 used is longer than intended for application on the silver layer. The part of the copper strip 12 not applied on the silver layer is overlappingly applied on the adjacent copper strip 13 applied on the silver layer such that an overlapping arrangement 16 is created. The overlapping region has, for example, a length of approx. 1 cm. Since the copper strip 12 is a self-adhesive copper strip, it can easily be adhesively bonded onto the adjacent copper strip 13.

Figure 5:
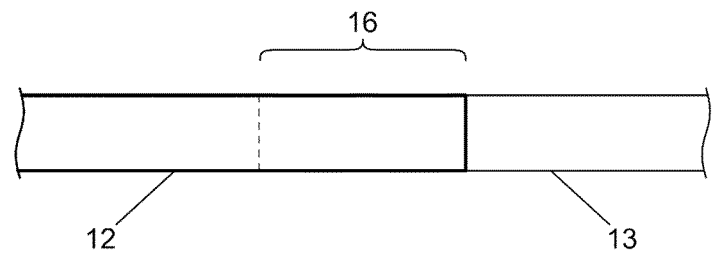
FIG. 5 schematically, an overlapping arrangement of two separate metal strips of the busbar in plan view.

FIG. 5 schematically depicts the overlapping arrangement of the copper strips 12, 13 of FIG. 4 in plan view.

LIST OF REFERENCE CHARACTERS

1 vehicle pane
2 outer polymeric carrier layer
3 outer electrically conductive layer
4 PDLC layer
5 inner electrically conductive layer
6 inner polymeric carrier layer
7, 8 busbar
9,10,11, 12, 13,14 separate electrically conductive metal strips of the busbar
15 bridge element
16 overlapping region
17, 18 connection elements (supply lines)
19 conductive intermediate layer
20, 21 long sides of the vehicle pane
22 coating with ceramic paint
100 prior art vehicle pane
101, 102 prior art busbar
103 coating with ceramic paint

The invention claimed is:

1. A vehicle pane comprising, in this order, an outer glass pane, one or a plurality of outer laminated layers, one or a plurality of inner laminated layers, and an inner glass pane, wherein a PDLC layer stack is arranged between the outer laminated layer and the inner laminated layer, which PDLC layer stack is formed from, in this order,
   a) an outer polymeric carrier layer,
   b) an outer electrically conductive layer,
   c) a PDLC layer,
   d) an inner electrically conductive layer, and
   e) an inner polymeric carrier layer,
   wherein at a lateral section of the PDLC layer stack, the outer polymeric carrier layer, the outer electrically conductive layer, and the PDLC layer are recessed such that the inner electrically conductive layer protrudes there together with the inner polymeric carrier layer, and at another lateral section of the PDLC layer stack, the inner polymeric carrier layer, the inner electrically conductive layer, and the PDLC layer are recessed such that the outer electrically conductive layer protrudes there together with the outer polymeric carrier layer, and
   a first busbar is arranged on the protruding inner electrically conductive layer and a second busbar is arranged on the protruding outer electrically conductive layer, which each of the first and second busbars is connected to, respectively, the protruding inner and outer electrically conductive layer of the PDLC layer stack via an electrically conductive intermediate layer, wherein
   the first and second busbars are each formed from at least two adjacent separate electrically conductive metal strips, which are arranged one behind the other in a same longitudinal direction, wherein the electrically conductive intermediate layer extends along said longitudinal direction between the at least two adjacent separate electrically conductive metal strips forming each of said first and second busbars, wherein the at least two adjacent separate electrically conductive metal strips are electrically conductively connected via at least one bridge element or an overlapping arrangement of the at least two adjacent separate electrically conductive metal strips that extends along said same longitudinal direction, wherein, when the at least two adjacent separate electrically conductive metal strips are electrically conductively connected via the at least one bridge element, the at least one bridge element electrically connects the at least two adjacent separate electrically conductive metal strips without covering a space that extends along said same longitudinal direction between the at least two adjacent separate electrically conductive metal strips, or
   wherein, when the at least two adjacent separate electrically conductive metal strips are electrically conductively connected via the overlapping arrangement, one of the at least two adjacent separate electrically conductive metal strips is not applied in its entire length on the electrically conductive intermediate layer and is overlappingly mounted on the other one of the at least two adjacent separate electrically conductive metal strips with a part of said one of the at least two adjacent separate electrically conductive metal strip not applied to the electrically conductive intermediate layer.

2. The vehicle pane according to claim 1, wherein the electrically conductive intermediate layer is a silver layer and/or the at least two electrically conductive metal strips are copper strips.

3. The vehicle pane according to claim 2, wherein the copper strip is a self-adhesive copper strip.

4. The vehicle pane according to claim 1, wherein the inner and outer electrically conductive layers of the PDLC layer stack are formed from transparent, conductive oxides.

5. The vehicle pane according to claim 4, wherein the conductive oxides include indium tin oxide.

6. The vehicle pane according to claim 1, wherein the bridge element is made of the same material as the at least two adjacent separate electrically conductive metal strips and/or is formed from copper strip.

7. The vehicle pane according to claim 1, wherein the bridge element is U-shaped, wherein one leg of the bridge element is mounted on one of the at least two adjacent separate electrically conductive metal strips, and the other leg of the bridge element is mounted on the other one of the at least two adjacent separate electrically conductive metal strips.

8. The vehicle pane according to claim 1, wherein in the overlapping arrangement, a length of a region in which the at least two adjacent separate electrically conductive metal strips overlap is in the range from 5 to 100 mm.

9. The vehicle pane according to claim 8, wherein the length of the region in which the at least two adjacent separate electrically conductive metal strips overlap is in the range from 10 to 30 mm.

10. The vehicle pane according to claim 1, wherein the at least one bridge element is mounted by gluing or soldering onto the at least two adjacent separate electrically conductive metal strips or, in the overlapping arrangement, a part of one of the at least two adjacent separate electrically conductive metal strips not applied on the intermediate layer is overlappingly mounted on the other one of the at least two adjacent separate electrically conductive metal strips by gluing or soldering.

11. The vehicle pane according to claim 1, wherein the busbars have a length of at least 60 cm, and/or
wherein a length of one of the at least two adjacent separate electrically conductive metal strips is in the range from 25 to 80 cm, wherein only the length of said one of the at least two adjacent separate electrically conductive metal strips applied on the electrically conductive intermediate layer is taken into account.

12. The vehicle pane according to claim 1, wherein a distance between at least two adjacent separate electrically conductive metal strips is in the range from 0 to 50 mm.

13. The vehicle pane according to claim 1, wherein each of the first and second busbars is formed from two, three, or four of the at least two adjacent separate electrically conductive metal strips.

14. The vehicle pane according to claim 1, wherein one busbar of the first and second busbars is arranged in a side region of one side of the vehicle pane, and the other busbar of the first and second busbars is arranged in the side region of the opposite side of the vehicle pane, wherein the two sides, in whose side regions the first and second busbars are arranged, are longer than the other two sides of the vehicle pane.

15. The vehicle pane according to claim 1, wherein the electrically conductive intermediate layer under at least one of the first and second busbars is a continuous electrically conductive intermediate layer.

16. The vehicle pane according to claim 1, wherein the vehicle pane is a motor vehicle pane.

17. The vehicle pane according to claim 16, wherein the motor vehicle pane is a sliding roof pane, a glass roof, a rear window, a rear side window, or a front side window.

18. A vehicle, including the vehicle pane according to claim 1.

19. The vehicle according to claim 18, wherein the vehicle is a motor vehicle.

20. The vehicle pane according to claim 1, wherein the at least one bridge element includes a plurality of segments, and wherein at least one segment of the plurality of segments extend along a second longitudinal direction that is different from said same longitudinal direction.

21. The vehicle pane according to claim 1, wherein the at least two adjacent separate electrically conductive metal strips are electrically conductively connected via the at least one bridge element.

* * * * *